United States Patent Office 3,309,394
Patented Mar. 14, 1967

3,309,394
PROCESS FOR THE SEPARATION OF ACRYLONITRILE AND ACETONITRILE
Arnold Hausweiler, Cologne-Flittard, and Bernhard Scherhag and Rudolf Haupt, Leverkusen, Germany, assignors to Farbenfabriken Bayer Aktiengesellschaft, Leverkusen, Germany, a corporation of Germany
No Drawing. Filed Oct. 22, 1963, Ser. No. 318,115
Claims priority, application Germany, Oct. 27, 1962,
F 38,174
3 Claims. (Cl. 260—465.3)

This invention relates to a process for the separation of acrylonitrile and acetonitrile.

In the processes for the production of acrylonitrile by catalytic oxidation of propylene or acrolein in the presence of ammonia, there are formed acetonitrile and hydrocyanic acid as secondary products.

The separation of acrylonitrile and acetonitrile presents considerable difficulties. The separation of acrylonitrile and acetonitrile by distillation requires a considerable number of separation stages and a high energy consumption, especially as the acrylonitrile should only contain very small quantities of acetonitrile in order to be suitable for processing to polymers.

Another process for separating acrylonitrile and acetonitrile is based on the extraction of the nitrile mixture with water and an organic solvent ("Duosol Extraction"), (see Belgian patent specification 606,187). In this arrangement, the organic solvent (toluene or cumene) takes up the acrylonitrile and the acetonitrile remains in the aqueous phase. Solvents and aqueous phases are then freed from the nitriles with considerable energy consumption, which can then be distilled to the required degree of purity.

In addition, the separation of acrylonitrile and acetonitrile can be successfully effected by extractive distillation of a very dilute aqueous solution of the two nitriles, acrylonitrile being distilled off azeotropically with water and acetonitrile remaining in the sump of the column (see Belgian patent specification 592,799).

The said separation processes are not free from major disadvantages. The distillation processes require an unusually large number of separation stages and also very large quantities of vapour on account of the extreme reflux condition.

When the separation is carried out by Duosol extraction, large quantities of an organic solvent have to be conducted cyclically involving considerable expense of energy and considerable losses.

According to another process, described in Belgian patent specification 616,116, the separation of acrylonitrile and acetonitrile can be effected at normal pressure by selectively washing the reaction gas from an acrylonitrile synthesis which contains the nitriles with water. In this process, all the acetonitrile and some of the acrylonitrile and hydrocyanic acid are washed out of the reaction gas in a washing column at normal pressure with water. From the waste gas, the acetonitrile-free acrylonitrile and the hydrocyanic acid are recovered in accordance with known processes by washing with water and, from the aqueous discharge from the column and for separating acrylonitrile and acetonitrile, the dissolved nitriles are driven off in a separate distilling column. The acrylonitrile contained in this nitrile mixture and the hydrocyanic acid must be separated from the acetonitrile to avoid losses.

It has now been found that in the separation of acrylonitrile and acetonitrile from gas mixtures containing both these components by washing out the acetonitrile in a washing column with water, particularly good results are produced if the washing out of the acetonitrile is effected under elevated pressure.

The process according to the invention is preferably carried out at a superatmospheric pressure of at least 0.2 atm., i.e., 1.2 atm. of pressure, and advantageously at a superatmospheric pressure of 0.5 atm. The upper pressure limit which can be used with advantage depends on the composition of the gas mixture and is limited by the pressure at which a condensation of the reaction products occurs. With the usual synthesis reaction for the production of acrylonitrile from propylene or acrolein in the presence of ammonia and oxygen, there are for example formed gas mixtures of which the acrylonitrile content is generally not higher than 5% by volume. With such gas mixtures, a condensation of the acrylonitrile at room temperatures is initiated at approximately 1 atm., so that when using such gas mixtures, it is necessary to work with a superatmospheric pressure which should not exceed 1 atm. In the processing of such gas mixtures, it is expedient to work at pressures in the region of 0.8 to 1 atm. superatmospheric pressure, when working with gas temperatures between 20 and 60° C. If gas mixtures are used which have a lower content of acrylonitrile, it is obviously also possible to employ suitably higher pressures.

The process according to the invention can for example be carried out as follows:

In the process for the production of acrylonitrile from propylene, ammonia and oxygen in the presence of oxidation catalysts, a reaction gas is formed which contains acrylonitrile, acetonitrile and hydrocyanic acid in addition to unreacted ammonia and in addition to other gaseous constituents, such as carbon monoxides and possibly nitrogen. In order to simplify the working up of this gas mixture, the ammonia can be removed from this gas mixture in the usual way, e.g., by a scrubbing with warm, dilute sulphuric acid or better still by a scrubbing with ammonium bicarbonate solution. The reaction gas leaving the ammonium bicarbonate scrubbing arrangement at 35–50° C. may for example contain, depending on how the reaction is conducted, about 4–4.5% by volume of acrylonitrile, 0.3% by volume of acetonitrile and 0.4–1.5% by volume of hydrocyanic acid.

The reaction gas is preferably free of ammonia treated in a washing or scrubbing column at high pressure and in counter-current with a little water; the acetonitrile is then washed out of the gas mixture, while the greater quantity of the acrylonitrile and of the hydrocyanic acid leave the washing column with the gas and thereafter are washed out of the gas in a second washing operation with water which is conducted at normal pressure or better still at increased pressure. The quantity of water necessary for the two washing towers depends on the composition of the gas mixture, the degree to which it is required to remove the acetonitrile, the efficiency of the column and the working temperature and is easily to be determined beforehand by preliminary tests. From the sump discharge of the second washing column, a crude nitrile which no longer contains any acetonitrile is recovered by being driven off with steam. From this crude nitrile, it is now possible by a simple and uncomplicated distillation to recover an acrylonitrile which satisfies the conditions for the processing to polyacrylonitrile or copolymers.

The aqueous sump discharge of the washing column still contains acrylonitrile and hydrocyanic acid in addition to all the acetonitrile. From this water phase, it is possible first of all to drive off hydrocyanic acid and then acrylonitrile, contaminated with acetonitrile. This acrylonitrile, which preferably should not contain more acetonitrile than corresponds to the acrylonitrile-acetonitrile ratio in the reaction gases, can be returned into the gas stream advantageously free of ammonia, ahead of the washing column.

The acetonitrile remaining in the water phase can now either be purified by distillation or can be returned into the reactor.

The separation according to the invention is expediently carried out at temperatures in the washing column which are for example between approximately 20 and 45° C. It is desirable to allow the ammonia-free reaction gas to enter the column at a higher temperature, e.g. 40–50° C.

of acetonitrile per cubic meter of inert gas (at n.t.p.). The temperature of the gas was 45–50° C. Washing water at a temperature of 23–28° C. was supplied to the top of the column. The concentration of acetonitrile in the product separated from the waste gas following the column was less than 100 p.p.m.=0.01% in all the examples set out. When using less than the quantities of washing water as indicated in Table 1, the content of acetonitrile in the nitrile mixture increases to more than 100 p.p.m.

TABLE 1

| The gas charged contains: | | Supplied to top of column, kg. water/hour | Of the charge, there are in waste gas following the column: | | Pressure in column, atmos./super-atmospheric pressure |
|---|---|---|---|---|---|
| Nitrile mixture, kg./h. | Inert gas, m.³/h. | | Acrylonitrile, percent | Hydrocyanic Acid, percent | |
| 3.0 | 24 | 11 | 95 | 90 | 1.0 |
| 3.4 | 27 | 13 | 95 | 90 | 1.0 |
| 3.8 | 30 | 15 | 90 | 89 | 1.0 |
| 4.2 | 33 | 19 | 86 | 80 | 1.0 |
| 3.0 | 24 | 21 | 83 | 80 | 0 |
| 3.2 | 25.5 | 22 | 81 | 79 | 0 |
| 3.4 | 27 | 27 | 80 | 78 | 0 |

If gases containing ammonia are used, it may be advantageous to work at somewhat lower temperatures.

By comparison with the process described in Belgian Patent 616,116, the process according to the invention is distinguished by a substantially smaller consumption of water. The consequence of this is that the total proportion of acrylonitrile which is dissolved in the water is substantially smaller in the process according to the invention, so that the working up of the washing water resulting in the process according to the invention is substantially simplified. The expense for the equipment used in the separation of the acrylonitrile and acetonitrile is thus substantially reduced and made more simple and the energy requirement is less.

It was surprising that it was possible when carrying out the process according to the invention to wash out the acetonitrile contained in the gas mixture with a substantially smaller quantity of water, without simultaneously the acrylonitrile content in the washing water being likewise increased in corresponding manner. It was surprisingly found that the total quantity of acrylonitrile which transferred into the washing water with the process according to the invention is smaller than with the process disclosed in Belgian patent specification 616,116.

The process according to the invention is explained by the following examples.

*Example 1*

It is to be seen from the following table to what extent the quantity of washing water is reduced and the loading capacity of the separation column is increased when carrying out the separation process at high pressure. Reaction gases from an acrylonitrile synthesis reaction were introduced into the sump of a bubble plate column having 30 effective plates, the said gases containing 85 g. of acrylonitrile, 30 g. of hydrocyanic acid and 85 g.

The column is overloaded.

We claim:
1. A method for the separation of acrylonitrile from a gaseous substantially ammonia free mixture comprising acrylonitrile and acetonitrile produced by the catalytic oxidation of propylene or acrolein in the presence of ammonia which comprises:
   (a) contacting the mixture with water at a temperature in the range of from 20° C. to 60° C. and at a pressure of 1.2 to 2 atm.;
   (b) extracting the acetonitrile; and
   (c) recovering the acrylonitrile from the acetonitrile extracted mixture.

2. A method according to claim 1 wherein the acrylonitrile is extracted with water at a pressure of 1.2 to 2 atm.

3. In a process for the production of acrylonitrile which comprises catalytically oxidizing propylene or acrolein in the presence of ammonia to form a mixture comprising acrylonitrile and acetonitrile, removing the ammonia and separating the acrylonitrile thus formed, the improvement which comprises contacting the formed acetonitrile with water at a pressure of 1.2 to 2 atm., extracting it from the mixture, and recovering the remaining acrylonitrile.

References Cited by the Examiner
UNITED STATES PATENTS

| 2,738,030 | 3/1956 | Keller et al. | 260—465.9 X |
| 2,980,726 | 4/1961 | Johnson | 260—465.9 |
| 2,980,727 | 4/1961 | Johnson | 260—465.9 |
| 3,210,399 | 10/1965 | Krzemicki | 260—465.3 |
| 3,219,685 | 11/1965 | Roelen et al. | 260—465.3 |

CHARLES B. PARKER, *Primary Examiner.*

JOSEPH P. BRUST, *Examiner.*